(12) United States Patent
Delpier et al.

(10) Patent No.: US 11,081,846 B2
(45) Date of Patent: Aug. 3, 2021

(54) CONNECTORS

(71) Applicant: HEWLETT-PACKARD DEVELOPMENT COMPANY, L.P., Houston, TX (US)

(72) Inventors: Michael Delpier, Houston, TX (US); Chad P Paris, Houston, TX (US); Eric Chen, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 287 days.

(21) Appl. No.: 16/074,191

(22) PCT Filed: Sep. 15, 2016

(86) PCT No.: PCT/US2016/051980
§ 371 (c)(1),
(2) Date: Jul. 31, 2018

(87) PCT Pub. No.: WO2018/052430
PCT Pub. Date: Mar. 22, 2018

(65) Prior Publication Data
US 2021/0143589 A1      May 13, 2021

(51) Int. Cl.
*H01R 24/60* (2011.01)
*G06F 1/16* (2006.01)
(Continued)

(52) U.S. Cl.
CPC .......... *H01R 24/60* (2013.01); *G06F 1/1632* (2013.01); *G06F 13/382* (2013.01); *H01R 24/86* (2013.01); *H01R 27/02* (2013.01)

(58) Field of Classification Search
CPC ......... H01R 24/60; H01R 24/86; G06F 1/632; G06F 13/382
(Continued)

(56) References Cited

U.S. PATENT DOCUMENTS 6,206,724 B1 * 3/2001 Leung .................... H01R 24/62
                                                     439/540.1
7,811,110 B2 * 10/2010 He ........................ H01R 24/62
                                                     439/218
(Continued)

FOREIGN PATENT DOCUMENTS

CN       104319576 A      1/2015
CN       104319578 A      1/2015
(Continued)

OTHER PUBLICATIONS

"Universal Serial Bus Type-C Cable and Connector Specification", Release 1.0, USB 3.0 Promoter Group, Aug. 11, 2014, 5 pages.
(Continued)

*Primary Examiner* — Alexander Gilman
(74) *Attorney, Agent, or Firm* — HPI Patent Department

(57) ABSTRACT

In an example, a connector may comprise a female connection port including a first power trace and a first signal trace disposed within the female connection port, and a male connection plug rigidly attached to the female connection port and disposed adjacent to the female connection port. The male connection plug may include a second power trace and a second signal trace disposed on an outer surface of the male connection plug.

15 Claims, 4 Drawing Sheets

(51) Int. Cl.
*G06F 13/38* (2006.01)
*H01R 24/86* (2011.01)
*H01R 27/02* (2006.01)

(58) Field of Classification Search
USPC .......................................................... 439/660
See application file for complete search history.

(56) References Cited

U.S. PATENT DOCUMENTS

| | | | | |
|---|---|---|---|---|
| 8,007,320 | B1* | 8/2011 | Zhang | H01R 27/02 439/638 |
| 8,123,562 | B2* | 2/2012 | Zhou | H01R 13/65912 439/607.48 |
| 8,195,852 | B2 | 6/2012 | Tantos et al. | |
| 8,328,579 | B2* | 12/2012 | Sasaki | H01R 13/659 439/607.25 |
| 8,485,843 | B2* | 7/2013 | Chang | H01R 24/64 439/541.5 |
| 8,568,173 | B2* | 10/2013 | Wu | H01R 13/648 439/607.56 |
| 8,721,364 | B2* | 5/2014 | Lai | H01R 12/716 439/541.5 |
| 8,777,664 | B2* | 7/2014 | Gui | H01R 13/6471 439/607.25 |
| 8,992,256 | B2* | 3/2015 | Chen | H01R 29/00 439/607.23 |
| 9,093,798 | B2 | 7/2015 | Locker et al. | |
| 9,184,545 | B2* | 11/2015 | Chen | H01R 13/506 |
| 9,190,781 | B2* | 11/2015 | Chang | H01R 13/6683 |
| 9,362,682 | B2* | 6/2016 | Chien | H01R 27/02 |
| 9,509,109 | B2* | 11/2016 | Pocrass | H01R 24/64 |
| 9,948,046 | B1* | 4/2018 | Peng | H01R 13/6586 |
| 10,109,959 | B1* | 10/2018 | Reynov | H05K 1/18 |
| 2002/0131234 | A1* | 9/2002 | Sterner | G06F 1/1632 361/679.41 |
| 2003/0008566 | A1 | 1/2003 | Kato et al. | |
| 2005/0070157 | A1* | 3/2005 | Neo | H01R 31/02 439/542 |
| 2007/0077811 | A1* | 4/2007 | Kim | H01R 13/73 439/540.1 |
| 2008/0196334 | A1* | 8/2008 | Mangiardi | A61B 50/362 52/220.8 |
| 2010/0308037 | A1* | 12/2010 | Mangiardi | H02G 3/185 220/3.5 |
| 2011/0111625 | A1* | 5/2011 | Chang | H01R 24/54 439/578 |
| 2011/0159732 | A1* | 6/2011 | Kondo | H01R 12/57 439/607.01 |
| 2012/0034819 | A1* | 2/2012 | Chen | H01R 31/065 439/638 |
| 2012/0252270 | A1* | 10/2012 | Lee | H01R 12/7088 439/607.01 |
| 2012/0252278 | A1* | 10/2012 | Chang | H01R 13/6658 439/660 |
| 2013/0051737 | A1* | 2/2013 | Chang | G02B 6/4292 385/92 |
| 2013/0084725 | A1* | 4/2013 | Liao | H01R 31/06 439/170 |
| 2013/0188300 | A1* | 7/2013 | Schrock | G11B 33/124 361/679.01 |
| 2014/0191707 | A1* | 7/2014 | Carreon | H04M 1/04 320/107 |
| 2014/0233172 | A1* | 8/2014 | Ryann | H01F 38/14 361/679.43 |
| 2014/0315431 | A1* | 10/2014 | Pocrass | H01R 27/02 439/607.01 |
| 2014/0335709 | A1* | 11/2014 | Chung | H01R 31/06 439/172 |
| 2015/0019769 | A1* | 1/2015 | Bapseres | G06F 13/385 710/63 |
| 2015/0135267 | A1* | 5/2015 | Samorukov | G06F 11/1004 726/2 |
| 2015/0270733 | A1* | 9/2015 | Inha | H02J 7/342 320/103 |
| 2015/0331826 | A1* | 11/2015 | Ghosh | G06F 13/4027 710/313 |
| 2016/0091925 | A1* | 3/2016 | Ardisana, II | G06F 1/1632 361/679.43 |
| 2016/0093994 | A1* | 3/2016 | Chen | H01R 12/724 439/607.01 |
| 2016/0141822 | A1* | 5/2016 | Hijazi | H01R 13/6595 361/679.31 |
| 2016/0181743 | A1* | 6/2016 | Tsai | H01R 13/5202 439/587 |
| 2016/0294135 | A1* | 10/2016 | Susini | H01R 24/20 |
| 2017/0025807 | A1* | 1/2017 | Martin | F21S 8/04 |

FOREIGN PATENT DOCUMENTS

| | | |
|---|---|---|
| CN | 104332771 B | 8/2016 |
| RU | 2013119636 A | 11/2014 |
| TW | 200522453 A | 7/2005 |
| TW | 200838056 A | 9/2008 |
| TW | 201530926 A | 8/2015 |
| WO | 2005031583 A1 | 4/2005 |
| WO | 2008062400 A2 | 5/2008 |

OTHER PUBLICATIONS

Piltch, "USB Type-C FAQ: Everything You Need to Know", Retrieved from Internet: https://www.laptopmag.com/articles/usb-type-c-faq, Mar. 11, 2015, 9 pages.

"USB 3.0 Connectors and Receptacles Explained", CNXSoft—Embedded System News, Mar. 25, 2014, 11 pages.

* cited by examiner

CONNECTORS

BACKGROUND

Devices, for example electronic devices, may electrically engage with additional devices. Devices may engage with other devices through connectors such as electrical connectors. Connectors may transmit power and/or data signals from one device to another. Connectors may be removable from devices, and may also engage with many different devices.

DETAILED DESCRIPTION

Figure 1:
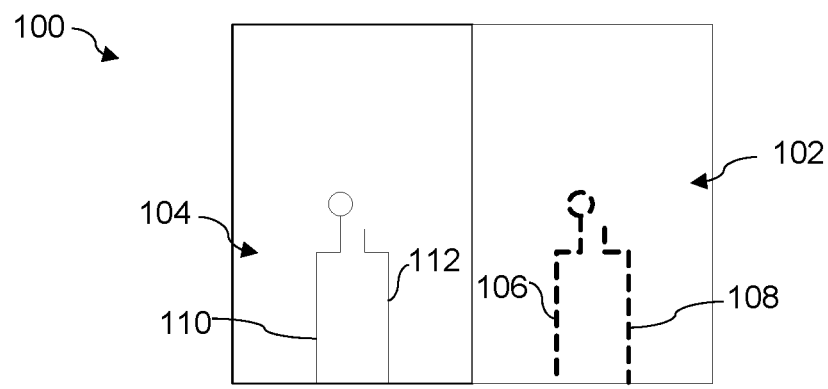
FIG. 1 is a schematic view of an example connector.

Devices such as electronic devices and/or computing devices, for example, may engage with one another through the use of connectors such as electrical connectors. Electrical connectors may include electrical pathways for power and/or data signals. Such pathways may sometimes be referred to as contacts or traces. Power and signal pathways may enable connectors to transfer power and data signals, respectively, from one electronic device to another. In some situations, connectors may include either power pathways or signal pathways, exclusively. In other situations, connectors may include pathways for both power and data signals.

In some situations, the amount, magnitude, or bandwidth of power and/or data signals that may be transferred by a given connector may be finite or limited. As such, in order to transfer a higher amount of power or data signals from one device to another, additional connectors may be used. Sometimes a connector may be capable of transferring a sufficient amount of data from one device to another, but the connector may lack the ability to transfer a sufficient amount of power from the first device to the second. In such a situation, a second connector may be used to supplement the transfer of power. Such a second connector may be a dedicated power connector. Conversely, in some situations, a connector may be able to transfer a sufficient amount of power from one device to another, but may lack enough signal pathways, or may lack signal pathways that are robust enough to transfer the whole bandwidth or magnitude of the desired data signals. In such a situation, a second connector may be employed to supplement the transfer of data signals from the first device to the second device.

In some situations, signal and/or power pathways may be disposed closely to one another in a connector. Such close proximity of the pathways may result in the deterioration of a data signal being transferred through the connector. In other words, neighboring power or signal pathways may cause noise or unwanted electromagnetic interference with a data signal being transferred through the connector.

Additionally, in some situations, connectors may be plugged and unplugged from a device to transfer power and/or data, and to cease the transfer of power and/or data, respectively. During a plugging or engaging operation, the connector may be misaligned with the receiving port or connector to such a degree so as to not be able to be correctly engaged with or plugged into the receiving connector. Further, the physical structure of the connector or the receiving connector may be insufficiently robust such that attempting to engage the connector with the receiving connector while they are misaligned may result in damage to either of the connector or receiving connector.

Implementations of the present disclosure provides a connector having power and data signal pathways to enable the transfer of power and data signals from one device to another device. Further, examples of connectors described herein provide a robust structure having a male portion and a female portion that may prevent the connector from being damaged while engaging the connector with a second, or receiving connector. Additionally, examples of connectors described herein provide power and signal pathways that may be sufficiently spread apart across the connector so as to preserve data signal integrity and avoid interference with the data signal from noise, which may originate in a neighboring signal or power pathway in the connector.

Referring now to FIG. 1, a schematic view of an example connector 100 is illustrated. The example connector 100 may include a female connection port 102, and a male connection plug 104. The female connection port 102 may include a first power trace 106 and a first signal trace 108. The first power trace 106 and the first signal trace 108 may be disposed within the female connection port 102 and, as such, are represented by phantom lines. Further, the male connection plug 104 may be rigidly attached or connected to the female connection plug 102, and may be disposed adjacently to the female connection port 102. The male connection plug 104 may include a second power trace 110 and a second signal trace 112. The second power trace 110 and the second signal trace 112 may be disposed on an outer surface of the male connection plug 104.

Figure 2A:
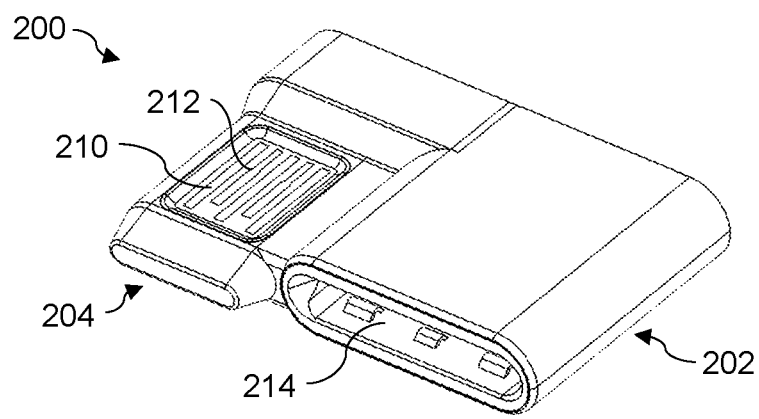
FIG. 2A is a perspective view of an example connector.
Figure 2B:
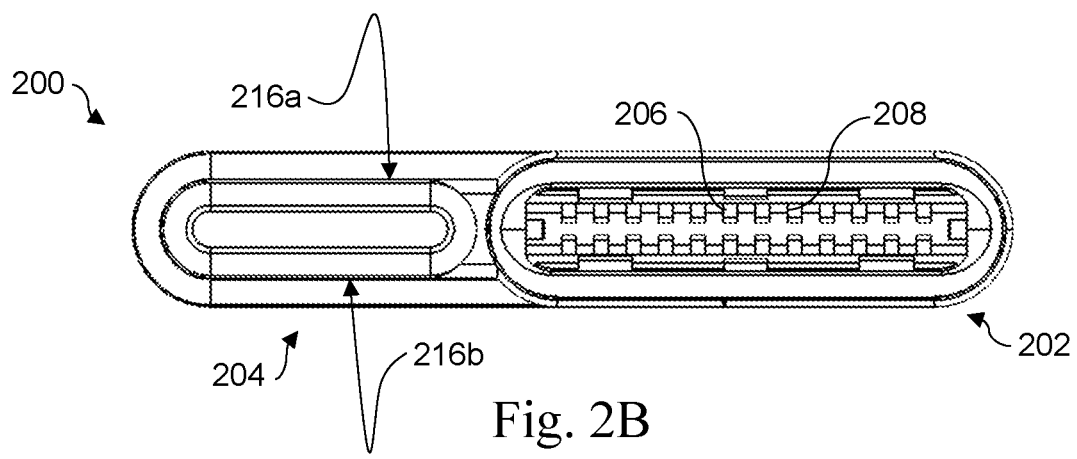
FIG. 2B is a front view of an example connector.

Referring now to FIG. 2A, a perspective view of an example connector 200 is illustrated. Example connector 200 may be similar to example connector 100. Further, the similarly named elements of example connector 200 may be similar in function and/or structure to the elements of example connector 100, as they are described above. Example connector 200 may include a female portion 202 and a male portion 204. The female portion 202 may be a female connector port 202 for receiving and engaging with a complementary male connection plug. Referring additionally to FIG. 2B, a front view of the example connector 200 is illustrated. The female connection port 202 may include a first power pathway 206 and a first signal pathway 208. Each of the first power and first signal pathways may be electrical pathways. In some implementations, the electrical pathways may referred to as traces or contacts. The first power pathway 206 may be an electrical conduit for conducting or transferring power through the connector. Similarly, the first signal pathway 208 may be an electrical conduit for conducting or transferring an electrical data signal through the connector 200. In some implementations, the first signal pathway 208 may transfer another type of data signal, such as an optical signal, for example. In some implementations, the first power and/or first signal pathways 206 and 208 may include a metallic material, such as copper, gold, or another material suitable for the conduction of power and data signals, respectively.

In some implementations, the first power pathway 206 may be one of a first set of power pathways, and the first signal pathway 208 may be one of a first set of signal pathways, as illustrated in FIG. 2B. In some implementations, the first power pathway 206 and the first signal pathway 208 may each be disposed within the female connection port 202. In further implementations, the first power pathway 206 and the first signal pathway 208 may each be disposed in an inner surface within the female connection port 202. In yet further implementations, the first power pathway 206 may be disposed on a first inner surface within the female connection port 202, and the first signal trace 208 may be disposed on a second inner surface within the female connection port 202. In some implementations, the first inner surface may be an upper inner surface, and the second inner surface may be a lower inner surface, or vice versa. In some implementations, the first and/or second inner surface may be a side inner surface, and in further implementations, the first and second inner surface may be the same inner surface, or may be parallel or co-planar. In some implementations, the female connection port 202 may be or may be compatible with a standard off-the-shelf electrical connector. In further implementations, the female connector port 202 may be a Universal Serial Bus (USB) connector, and in yet further implementations, the female connector port 202 may be a USB type C connector, or compatible therewith and capable of engaging with a male USB type C plug.

Referring still to FIGS. 2A-B, the example connector 200 may also include a male portion 204. The male portion 204 may be a male connection plug 204 to engage with and/or be received within a complementary female connection port, in some implementations. The male connection plug 204 may include a second power pathway 210 and a second signal pathway 212. Each of the second power and second signal pathways may be electrical pathways. In some implementations, the second signal pathway 212 may be another type of pathway, such as an optical pathway for the transfer of optical signals, for example. In some implementations, the electrical pathways may referred to as traces or contacts. The second power pathway 210 may be an electrical conduit for conducting or transferring power through the connector. Similarly, the second signal pathway 212 may be an electrical conduit for conducting or transferring an electrical data signal through the connector 200. In some implementations, the second power and/or second signal pathways 210 and 212 may include a metallic material, such as copper, gold, or another material suitable for the conduction of power and data signals, respectively. In further implementations, the second power pathway 210 may be longer than the second signal pathway 212. In such an implementation, the second power pathway 210 may engage with a mating power pathway on a mating connector or device before the second signal pathway 212 engages with a corresponding signal pathway on the mating device in order to enable hot-swap ability of the connector 200.

In some implementations, the second power pathway 210 may be one of a second set of power pathways, and the second signal pathway 212 may be one of a second set of signal pathways, as illustrated in FIG. 2A. In some implementations, the second power pathway 210 and the second signal pathway 212 may each be disposed on an outer surface of the male connection plug 204. In further implementations, the second power pathway 210 may be disposed on a first outer surface 216a of the male connection plug 204, and the second signal pathway 212 may be disposed on a second outer surface 216b of the male connection plug 204. In some implementations, the first outer surface 216a may be an upper outer surface, and the second outer surface 216b may be a lower outer surface, as illustrated, or vice versa. In some implementations, the first and/or second outer surface may be a side outer surface, and in further implementations, the first and second outer surface may be the same outer surface, or may be parallel or co-planar. In some implementations, the second set of power pathways, or a first power pathway 210 thereof, and the second set of signal pathways, or the second signal pathway 212 thereof, may be electrically and/or electromagnetically insulated from the first set of power pathways, or the first power pathway 206 thereof, and the first set of signal pathways, or the first signal pathway 208 thereof. In other words, the first signal pathway 208 of the female connection port 202 may be electrically and/or electromagnetically insulated from the second signal pathway 212 and the second power pathway 210 of the male connection plug 204. Such isolation of the pathways of the male connection plug 204 from the pathways of the female connection port 202 may prevent noise or electromagnetic interference originating from either the male or female portions from degrading the signal integrity of the other portion. Further, by utilizing signal pathways in both the male and female portions, less signal bandwidth may be transferred through either the male and female portions individually. By decreasing the signal throughput of either the male or female portions, signal interference and/or noise can be avoided or minimized, thereby maintaining or preserving signal integrity.

Note, in some implementations, each of the first and second set of power pathways and the first and second set of signal pathways may include multiple power pathways and signal pathways, respectively. As such, identifiers 206 and 208, and 210 and 212, as illustrated in FIGS. 2A-B, each call out example pathways as representing the first and second power pathways and the first and second signal pathways, respectively. Therefore, the first and second power pathways 206 and 210, and the first and second signal pathways 208 and 212 may each actually be a different pathway than as identified in FIGS. 2A-B.

The male connection port 204 may be disposed adjacent to the female connection port 202, in some implementations. Thus, upon the connector 200 being engaged with a mating connector, both the male connection plug 204 and the female connection port 202 may become operably engaged with a complementary portion of the mating connector at the same time. In further implementations, the male connection plug 204 may be rigidly attached to or engaged with the female connection port 202. In some implementations, the male connection plug 204 and the female connection port 202 may be rigidly attached to one another along a length of the connector 200, thereby making each of the male connection plug 204 and the female connection port 202 more stiff, or less flexible. Therefore, an outside force or torque applied against the female connection port 202 may be transferred to and mitigated by the male connection plug 204, or vice versa, through such a rigid engagement or attachment. Therefore, by rigidly engaging the male connection plug 204 with the female connection port 202, the connector 200 may be more robust or strong than either the female connection port 202 or the male connection plug by itself or individually.

Figure 3A:
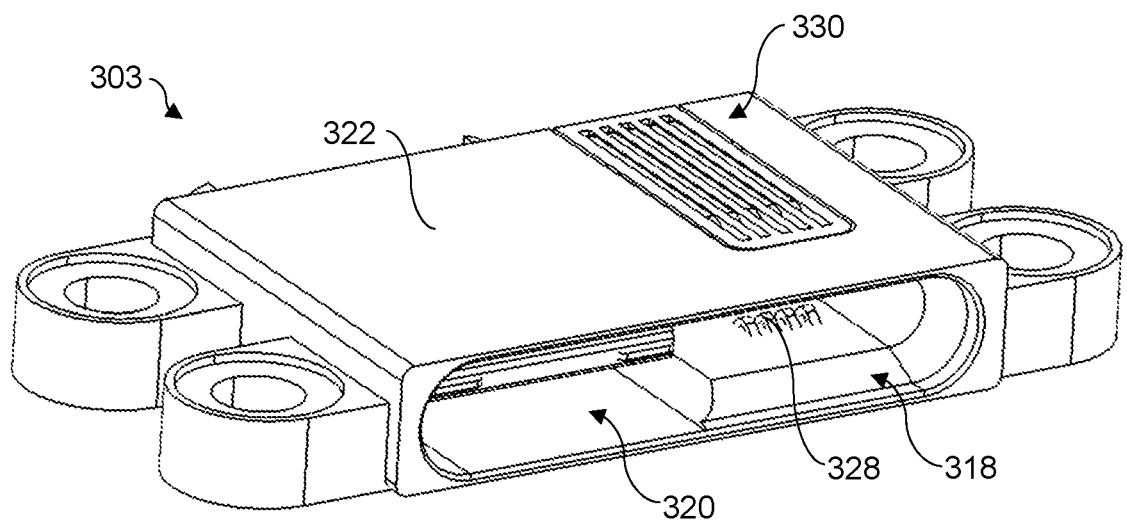
FIG. 3A is a perspective view of an example connector.
Figure 3B:
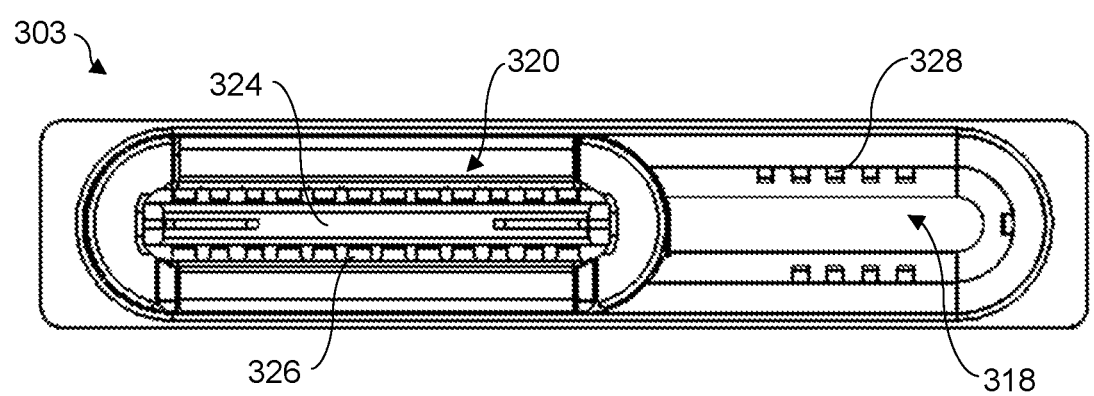
FIG. 3B is a front view of an example connector.

Referring now to FIGS. 3A-B, a perspective view and a front view of an example second connector 303 is illustrated. The second connector 303 may operably mate and engage with an example first connector 300. Example first connector 300 may be similar to example connectors described above. Further, the similarly named elements of example first connector 300 may be similar in function and/or structure to the elements of other example connectors, as they are described above. In some implementations, the example second connector 303 may include a second female connection port 318 and a second male connection plug 320. The second female connection port 318 may be structured so as to be able to receive the first male connection plug 304 of the first connector 300. Similarly, the second male connection plug 320 may be structured so as to be able to operably engage with and be received within the first female connection port 302 of the first connector 300. The second female connection port 318 may include a set of power and signal pathways 330. The set of power and signal pathways 330 may include multiple electrical pathways, contacts, or traces 328. In some implementations, the female connection port 318 may include a first power pathway and a first signal pathway, both represented by an electrical pathway 328.

In some implementations, the second male connection plug 320 may include a protruding portion 324. The protruding portion 324 may include a set of signal and power pathways having multiple electrical pathways, contacts, or traces 326. In some implementations, the protruding portion of the second male connection plug 320 may include a second power pathway and a second signal pathway, both represented by an electrical pathway 326. In some implementations, the second male connection plug 320 may be a male USB plug. In further implementations, the second male connection plug 320 may be a USB type C plug, and may operably engage with any female USB type C port, regardless of whether the second female connection port 318 is engaged with a mating connector.

Figure 3C:
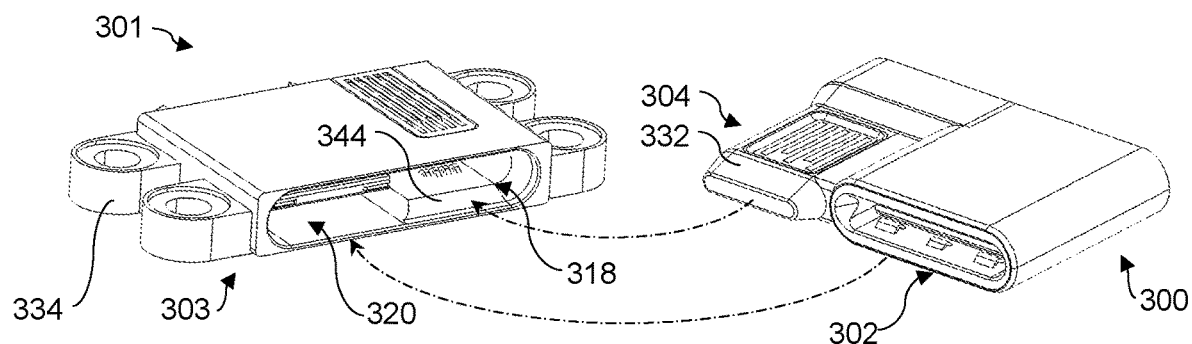
FIG. 3C is a perspective view of engagement of example connectors.

Referring now to FIG. 3C, a connector set 301 is illustrated. The connector set 301 may include the first connector 300 and the second connector 303. The first connector 300 may include a first female connection port 302 and a first male connection plug 304. In some implementations, the first connector 300 may mate to and operably engage with the second connector 303 such that the transfer of power and data signals may occur between the first and second connectors 300 and 303. More specifically, the first female connection port 302 may engage with and/or receive the second male connection plug 320 within the first female connection port 302, and the first male connection plug 304 may mate with and be received within the second female connection port 318. In some implementations, the first and second connectors 300 and 303 may mate with each other in a manner similar to that as represented by the reference arrows of FIG. 3C. In further implementations, the male and female portions of each of the first and second connectors 300 and 303 may be reversed, such that the male portions may be disposed where the female portions are currently illustrated, and vice versa. In such a situation, both the first and second connectors 300 and 303 may still have both a male portion and a female portion.

In order to transfer power and data signals between the first and second connectors 300 and 303, the connectors may engage such that the power and signal pathways of each connector are operably engaged with each other, respectively. In other words, the power pathways of the first connector 300, on both the first female connection port 302 and the first male connection plug 304, may engage with respective power pathways disposed on the second male connection plug 320 and the second female connection port 318. Similarly, the signal pathways of the first connector 300, on both the first female connection port 302 and the first male connection plug 304, may engage with respective signal pathways disposed on the second male connection plug 320 and the second female connection port 318. In some implementations, the number, location, and orientation of the power and signal pathways of the second connector 303 may match that of the power and signal pathways of the first connector 300. Therefore, for example, regarding the engagement of the first male connection plug 304 and the second female connection port 318, if the first male connection plug 304 includes power and signal pathways on upper and lower outer surfaces, then the second female connection port 318 may include corresponding and complementary power and signal pathways on upper and lower inner surfaces of the second female connection port 318. Similarly, regarding the engagement between the first female connection port 302 and the second male connection plug 320, if the second male connection plug 320 includes power and signal pathways on upper and lower outer surfaces of the protruding portion 324, then the first female connection port 302 may include corresponding and complementary power and signal pathways on upper and lower inner surfaces of the first female connection port 302.

In some implementations, the first male connection plug 304 may include an alignment portion 332 disposed on a leading edge of the first male connection plug 304. Such an alignment portion 332 may be an angled surface, a chamfer, a bevel, or have another suitable geometry such that the alignment portion 332 may align the first male connection plug 304 with the second female connection port 318 of the second connector 303 if they should be misaligned. The alignment portion 332 may align the first male connection plug 304 with the second female connection port 318 such that they engage correctly and the transfer of power and data signals can occur between the two. In some implementations, the second female connection port 318 may include a second alignment portion 344 to assist the alignment portion 332 in correctly aligning the first male connection plug 304 with the second female connection port 318. The second alignment portion 344 may be an angled surface, a chamfer, or a bevel, or another suitable feature to help align the first male connection plug 304 with the second female connection port 318.

In further implementations, the second connector 303 may include an attachment portion 334 to attach the second connector 303 to a device. In some implementations, the attachment portion 334 may be an anchor or aperture through which a fastener, such as a screw, pin, bolt, or another suitable fastener may be inserted in order to anchor or attach the second connector 303 to the device. In some implementations, the second connector 303 may be fastened, attached, or soldered to a printed circuit board (PCB) of an electronic device.

Figure 4A:
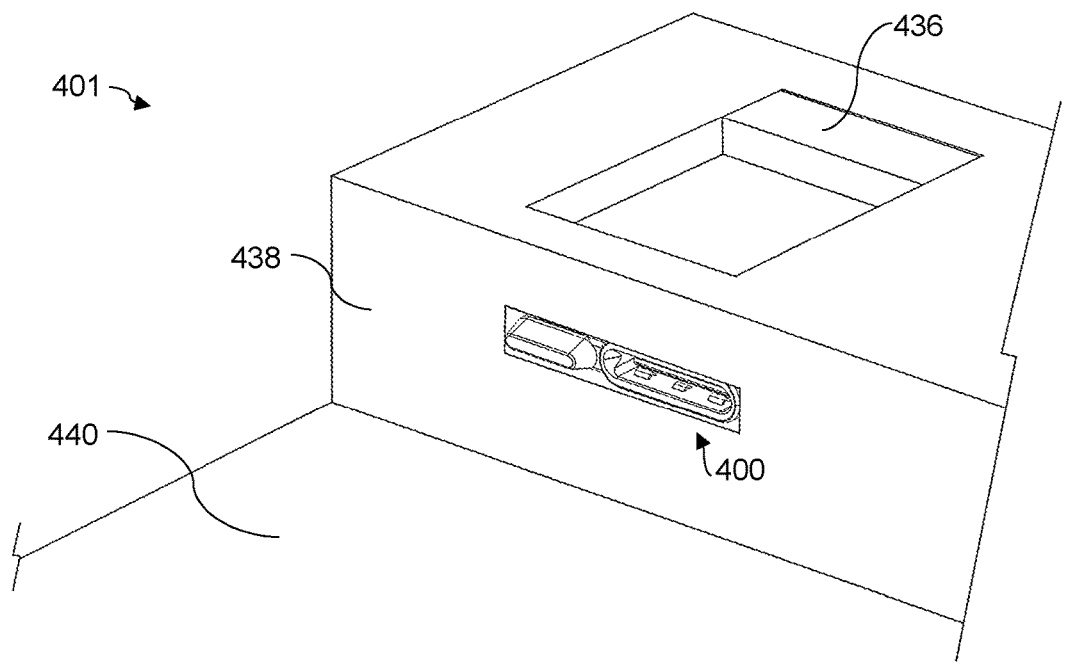
FIG. 4A is a perspective view of an example device including an example connector.
Figure 4B:
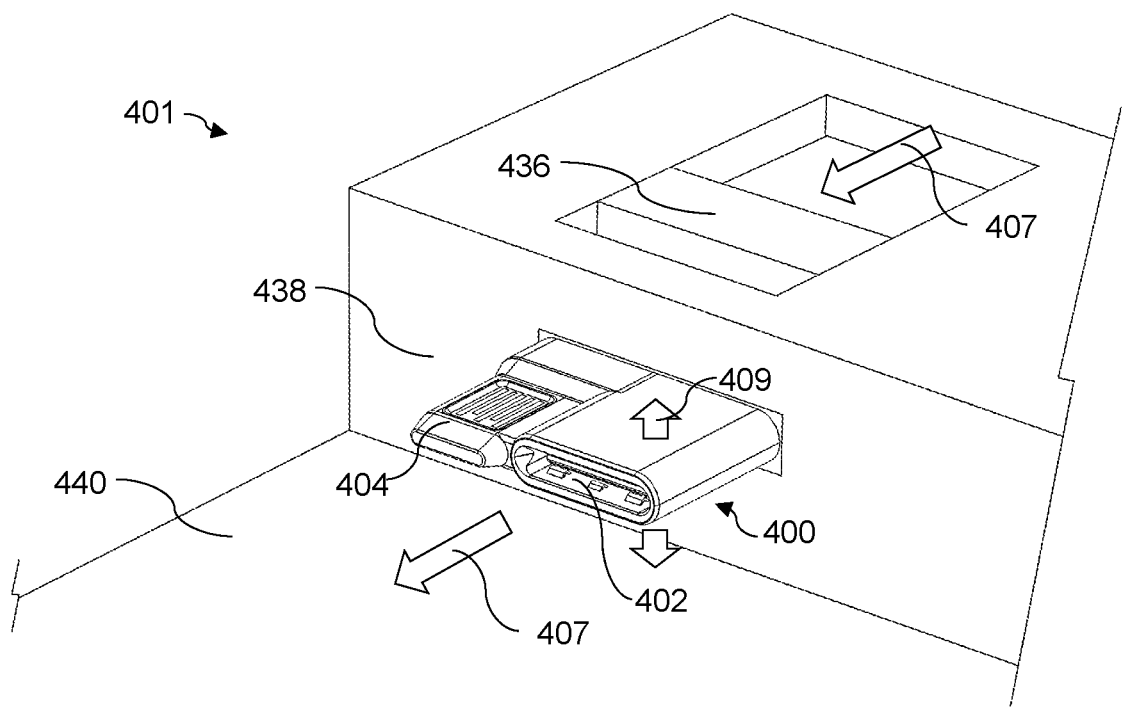
FIG. 4B is a perspective view of an example device including an example connector.

Referring now to FIGS. 4A-B, a perspective view of an example device 401 including an example first connector 400 is illustrated. Example first connector 400 may be similar to example connectors described above. Further, the similarly named elements of example first connector 400 may be similar in function and/or structure to the elements of other example connectors, as they are described above. The example device 401, in some implementations, may be an electronic device. In further implementations, the device 401 may be a computing device, or a dock for an electronic device or a computing device.

In some implementations, the device 401 may include a first connector 400. The first connector 400, in some implementations, may include a first female connection port 402 and a first male connection plug 404. Further, the first connector 400 may be movably disposed wholly or partially within the device 401. In some implementations, the first connector 400 may be slidable relative to the device 401. In further implementations, the first connector 400 may be slidable relative to a docking portion 440 of the device 401. In some implementations, the docking portion 440 may receive another device, which may be an electronic device or a computing device. In yet further implementations, the first connector 400 may be movable from a withdrawn position, illustrated in FIG. 4A, to an extended position, illustrated in FIG. 4B, and vice versa. When disposed in the withdrawn position, the first connector 400 may be wholly or partially receded within a side portion 438 of the device 401. Conversely, when disposed in the extended position, the first connector 400 may extend out of the side portion 438 of the device 401 a sufficient amount so that the first connector 400 may engage with a mating connector in another device, described below. In some implementations, when disposed in the extended position, the first connector 400 may have the ability to float or move relative to the device 401, or a docking portion 440 thereof. Such ability to float may be represented by arrows 409. The first connector 400 may have the ability to float in order to be able to engage with a mating connector in a plurality of other devices, wherein the other devices may have varying or differing thickness or other dimensions. In other words, the first connector 400 may float so as to be received by a mating connector, or second connector disposed on a variety of different devices. When attempting to engage with a second connector that may be misaligned with the first connector 400, an alignment portion disposed on a leading edge of the first connector 400, upon contacting the second connector, may cause the first connector 400 to move relative to the device 401 in order to self-align with the second connector and operably engage with the second connector.

In some implementations, the first connector 400 may be engaged and disengaged with the second connector by being slidable along an engagement direction, represented by arrow 407. In some implementations, the first connector 400 may be operably engaged with an actuator 436. The actuator 436 may be slid or moved along the engagement direction 407 by a user or another mechanism. The movement of the actuator 436 along direction 407 may directly or indirectly cause the first connector 400 to also move along the engagement direction 407, as illustrated in FIG. 4B from the withdrawn position to the extended position, and vice versa. As such, the actuator may operably engage the first connector 400 with the complementary second connector.

Figure 4C:
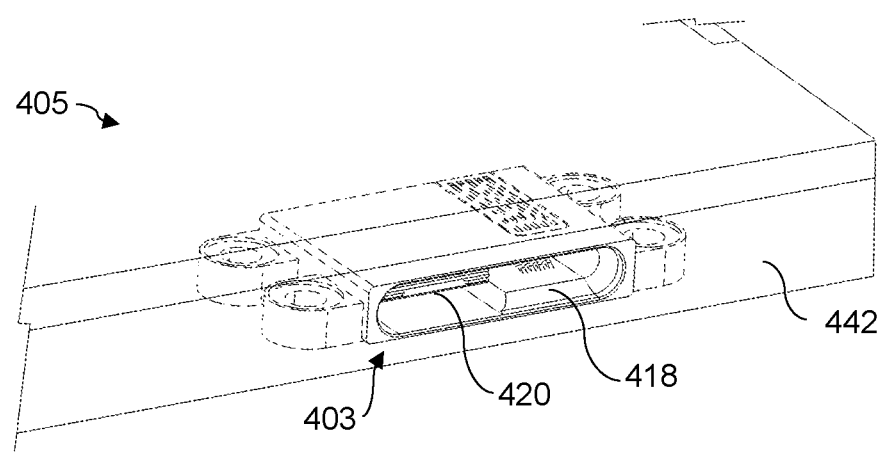
FIG. 4C is a perspective view of an example device including an example connector.

Referring now to FIG. 4C, a perspective view of an example second connector 403 is illustrated, wherein the second connector 403 is disposed within a device 405. Example second connector 403 may be similar to example second connectors described above. Further, the similarly named elements of example second connector 403 may be similar in function and/or structure to the elements of other example second connectors, as they are described above. The example second connector may be a complementary second connector to the first connector 400, and may be able to operably engage with the first connector 400 such that the transfer of power and data signals may occur between the first and second connectors 400 and 403. In further implementations, the second connector 403 may include a second female connection port 418 which may be complementary to and able to receive the first male connection plug 404, and a second male connection plug 420, which may be complementary to and able to be received within the first female connection port 402. In some implementations, the second connector 403 may be disposed within a device 405 adjacent to a sidewall 442 of the device 405. Such a disposition may enable the second connector 403 to operably engage with the first connector 400 when the device 405 is engaged with or docked with the device 401. In some implementations, the device 405 may be an electronic device, such as a computing device for example. The computing device may include components such as processors, memory, storage drives, optical drives, user interfaces, and other components suitable for use in a computing device. In further implementations, the device 405 may be a notebook computer, and the device 401 may be a computer dock to receive the notebook computer on the docking portion 440. Once received on the docking portion 440, the actuator 436 may be utilized to slide the first connector 400 along the engagement direction 407 in order to operably engage the first connector 400 with the second connector 403 such that the transfer or exchange of power or data signals may occur between the notebook computer and the dock through the first and second connectors 400 and 403. Note, in some implementations, the first connector 400 may actually be disposed in device 405, while the second connector 403 may be disposed in the device 401.

What is claimed is:

1. A connector, comprising:
   a housing;
   a female connection port comprising:
     a cavity defined by the housing that includes an inner surface;
     a first power trace; and
     a first signal trace,
     wherein the first power trace and the first signal trace are positioned along the inner surface of the cavity; and
   a male connection plug defined by the housing that is rigidly attached to the cavity of the female connection port and disposed adjacent to the cavity of the female connection port, the male connection plug comprising a second power trace and a second signal trace positioned along an external surface of the housing.

2. The connector of claim 1, wherein the first power trace is one of a first set of power traces and wherein the first signal trace is one of a first set of signal traces.

3. The connector of claim 1, wherein the second power trace is one of a second set of power traces and wherein the second signal trace is one of a second set of signal traces.

4. The connector of claim 1, wherein the first power trace is positioned along a first portion of the inner surface of the cavity and the first signal trace is positioned along a second portion of the inner surface of the cavity, wherein the first portion of the inner surface opposes the second portion of the inner surface within the cavity.

5. The connector of claim 1, wherein the second power trace is positioned along a first portion of the external surface of the housing, and the second signal trace is positioned along a second potion of the outer surface of the housing, and wherein the first portion of the external surface faces away from the second portion of the external surface.

6. The connector of claim 1, wherein the female connection port is a female Universal Serial Bus (USB) port.

7. The connector of claim 6, wherein the female connection port is a female USB type C port.

8. The connector of claim 7, wherein the first signal trace of the female USB type C port is insulated from the second signal trace and the second power trace of the male connection plug.

9. The connector of claim 1, wherein the male connection plug comprises an alignment portion disposed on a leading edge of the male connection plug.

10. A connector set, comprising:
a first connector, comprising:
- a first female connection port comprising a first power trace and a first signal trace disposed within the female connection port; and
- a first male connection plug rigidly attached to the first female connection port and disposed adjacent to the first female connection port, the first male connection plug comprising a second power trace and a second signal trace disposed on an outer surface of the male connection plug; and a second connector to mate with the first connector and comprising:
- a cavity defined by an inner wall;
- a second female connection port to receive the male connection plug including a plurality of third traces positioned along the inner wall of the cavity; and
- a second male connection plug including a protruding portion positioned within the cavity that is to engage with and be received within the female connection port of the first connector.

11. The connector set of claim 10, wherein the first male connection plug comprises an alignment portion disposed on a leading edge of the first male connection plug to align the first male connection plug with the second female connection port of the second connector such that the first male connection plug and the second female connector port engage correctly.

12. The connector set of claim 11, wherein the second male connection plug of the second connector is a USB type C plug.

13. The connector set of claim 12, wherein the second male connection plug may operably engage with any female USB type C port.

14. A dock, comprising:
first connector, comprising:
- a housing;
- a female connection port comprising:
  - a cavity defined by the housing that includes an inner surface;
  - a first power trace; and
  - a first signal trace,
  wherein the first power trace and the first signal trace are positioned along the inner surface of the cavity; and
- a male connection plug defined by the housing that is rigidly attached to the cavity of the female connection port and disposed adjacent to the cavity of the female connection port, the male connection plug comprising a second power trace and a second signal trace positioned along an external surface of the housing;
a docking portion to receive a computing device; and
an actuator to extend the housing to operably engage the first connector with a complementary second connector disposed on the computing device.

15. The dock of claim 14, wherein the first connector may float relative to the docking portion so as to be received by a second connector disposed on a variety of different computing devices.

* * * * *